United States Patent
Nate

(10) Patent No.: US 9,718,369 B2
(45) Date of Patent: Aug. 1, 2017

(54) ELECTRIC POWER SUPPLY DEVICE

(71) Applicant: TOYOTA JIDOSHA KABUSHIKI KAISHA, Toyota-shi, Aichi-ken (JP)

(72) Inventor: Hiroshi Nate, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/835,037

(22) Filed: Aug. 25, 2015

(65) Prior Publication Data
US 2016/0059722 A1   Mar. 3, 2016

(30) Foreign Application Priority Data
Aug. 28, 2014   (JP) .................................. 2014-173883

(51) Int. Cl.
| | |
|---|---|
| B60L 11/18 | (2006.01) |
| H02J 7/14 | (2006.01) |
| H02J 7/34 | (2006.01) |

(52) U.S. Cl.
CPC ....... B60L 11/1824 (2013.01); B60L 11/1848 (2013.01); B60L 11/1868 (2013.01); H02J 7/1423 (2013.01); H02J 7/34 (2013.01); *Y02T 10/7005* (2013.01)

(58) Field of Classification Search
CPC .............. B60L 11/1824; B60L 11/1868; B60L 11/1848

USPC ........................................................ 320/109
See application file for complete search history.

(56) References Cited

U.S. PATENT DOCUMENTS

| | | | |
|---|---|---|---|
| 2008/0029987 A1 | 2/2008 | Sugiyama | |
| 2009/0039707 A1 | 2/2009 | Ishizeki | |
| 2016/0039370 A1* | 2/2016 | Suzuki et al. | ........ B60R 16/033 307/10.1 |

FOREIGN PATENT DOCUMENTS

| | | |
|---|---|---|
| CN | 201089372 Y | 7/2008 |
| EP | 0116213 A1 | 8/1984 |
| EP | 1750346 A2 | 2/2007 |
| JP | 2012-240593 A | 12/2012 |

* cited by examiner

*Primary Examiner* — Sun Lin
(74) *Attorney, Agent, or Firm* — Sughrue Mion, PLLC

(57) ABSTRACT

An electric power supply device includes a first battery electrically connected to each of a plurality of load instruments mounted on a vehicle and supplying electric power to each of the load instruments, a second battery electrically connected to the first battery and each of the load instruments via a switch and capable of supplying electric power to each of the load instruments, and an electronic control unit (ECU) configured to cut off electrical connection between the second battery and each of the load instruments by turning OFF the switch under a condition that when a high-load instrument included in the load instruments is not in operation.

4 Claims, 4 Drawing Sheets

ELECTRIC POWER SUPPLY DEVICE

INCORPORATION BY REFERENCE

The disclosure of Japanese Patent Application No. 2014-173883 filed on Aug. 28, 2014 including the specification, drawings and abstract is incorporated herein by reference in its entirety.

BACKGROUND OF THE INVENTION

1. Field of the Invention

The invention relates to an electric power supply device that supplies electric power to a plurality of load instruments which are mounted on a vehicle.

2. Description of Related Art

The vehicle described above is provided with a battery that is charged by an electric power generator. A device in which a lead storage battery is electrically connected in parallel to an electric power storage device having a plurality of electric double layer capacitors has been proposed as an example of this type of devices. According to Japanese Patent Application Publication No. 2012-240593, a first path that allows a high-load instrument with a relatively large electrical load capacity, such as a starter and a power steering device, to be electrically connected to the electric power storage device via a DC/DC converter, a second path that allows the high-load instrument to be electrically connected to the electric power storage device not via a DC/DC converter, and a switch that turns ON/OFF each of the first path and the second path are disposed. Also, a technique has been disclosed in which electric power is supplied to the high-load instrument by using the first path when the load of the DC/DC converter is within the range of tolerance and electric power is supplied to the high-load instrument by using the second path, with the first path OFF, when the load of the DC/DC converter is equal to or greater than the tolerance so that the DC/DC converter and the second path are protected.

SUMMARY OF THE INVENTION

Depending on the load situation of the DC/DC converter, however, the electric power storage device and the high-load instrument are electrically connected to each other for a relatively long period of time and the charging and discharging amount of the electric power storage device becomes relatively large. This may accelerate the deterioration of the electric power storage device, which is conspicuous when a storage battery such as a nickel-hydrogen battery is used as the electric power storage device.

The invention provides an electric power supply device that is capable of inhibiting the deterioration of a battery which constitutes the electric power supply device.

According to an aspect of the invention, there is provided an electric power supply device for a vehicle including a first battery, a switch, a second battery, and an ECU. The vehicle includes a plurality of load instruments. The load instruments include a high-load instrument. The high-load instrument is a load instrument with reference electric power consumption equal to or greater than an electric power threshold. The first battery is electrically connected to each of the plurality of load instruments and supplies electric power to each of the load instruments. The second battery is electrically connected to the first battery and each of the load instruments via the switch and supplies electric power to each of the load instruments. The ECU is configured to control the switch to be OFF when the high-load instrument is not in operation.

According to the electric power supply device of the invention, the electric power supply device is configured to be provided with the first battery, the second battery, and the ECU.

The first battery supplies electric power to the load instruments that are electrical components mounted on the vehicle such as a light, an electric power steering device, an electric stabilizer, and the electronic control unit (ECU). The second battery is capable of supplying electric power to the load instruments when the switch is ON.

The first battery and the second battery are capable of repeated electric power charging and discharging. A secondary battery such as a lead storage battery, a nickel-hydrogen battery, and a lithium-ion battery and a capacitor such as an electric double layer capacitor can be applied thereto.

The ECU, which is provided with, for example, a memory and a processor, is configured to cut off electrical connection between the second battery and each of the load instruments by turning OFF the switch, on the condition that the high-load instrument as one of the load instruments is not in operation.

The "high-load instrument" according to the invention means a load instrument with reference electric power consumption equal to or greater than an electric power threshold. The "electric power threshold" may be set based on, for example, a relationship between the reference electric power consumption and the degree of temporary voltage reduction obtained experimentally, empirically, or based on a simulation and as reference electric power consumption corresponding to the maximum value of the degree of voltage reduction allowing an effect on the other load instruments or as reference electric power consumption which is smaller by a predetermined value than the reference electric power consumption.

The present inventors' research has revealed the followings. When the high-load instrument is mounted on the vehicle, electric power is supplied to each of the load instruments from the batteries (the "first battery" and the "second battery" in the invention) in view of voltage stabilization. However, a usual electrical connection of all of the batteries to each of the load instruments may result in a relatively high frequency of battery charging and discharging, which, in turn, may cause a technical problem by deteriorating the batteries relatively early. This problem can be addressed by, for example, increasing the size of the batteries to give a service life enduring the frequency of charging and discharging. However, this entails another technical problem by, for example, causing an increase in vehicle manufacturing cost and weight.

In the invention, the ECU is configured to cut off the electrical connection between the second battery and each of the load instruments, as described above, by turning OFF the switch on the condition that the high-load instrument as one of the load instruments is not in operation.

Accordingly, electric power is supplied from the batteries when the high-load instrument requiring a large amount of electric power within a short period of time, examples of which include an electric active stabilizer, is in operation, and thus a reduction in vehicular electric power supply voltage can be prevented. When the high-load instrument is not in operation, the second battery is electrically cut off from the load instruments, and thus the deterioration attributable to the charging and discharging of the second battery can be prevented.

In the aspect described above, the electric power supply device may further include a lateral acceleration sensor. The lateral acceleration sensor detects the lateral acceleration of the vehicle. In addition, the high-load instrument may be an electric active stabilizer. The ECU is configured to control the switch to be ON when the lateral acceleration is equal to or greater than an acceleration threshold.

According to the aspect described above, electric power can be supplied to the electric active stabilizer from both the first battery and the second battery when the electric active stabilizer, which is a high-load instrument, is in operation. Accordingly, a reduction in vehicular electric power supply voltage can be prevented, which is highly advantageous for practical purposes.

The "acceleration threshold" according to the invention, which is a value that is used in determining whether to turn ON the switch or not, is set in advance as a fixed value or as a variable value corresponding to any physical quantity or a parameter. The "acceleration threshold" may be set based on, for example, a relationship between the lateral acceleration and the electric power consumption by the electric active stabilizer obtained experimentally, empirically, or based on a simulation and as lateral acceleration which is lower by a predetermined value than the lateral acceleration corresponding to the electric power consumption at which voltage reduction is predicted to occur based on the obtained relationship.

In the aspect described above, the first battery and the second battery may be different types of batteries. In addition, the second battery may be a nickel-hydrogen battery, a lithium-ion battery, or an electric double layer capacitor.

According to this aspect, the deterioration of the second battery, which requires relatively high replacement costs, can be inhibited and the service life of the second battery can be extended, which is highly advantageous for practical purposes.

In the aspect described above, the first battery and the second battery may be electrically connected in parallel to each other.

According to this aspect, electric power can be stably supplied to the high-load instrument from both the first battery and the second battery when the switch is ON. Accordingly, a stable operation of the high-load instrument can be ensured.

The effect and the other advantages of the invention will be clarified in the following description of embodiments.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of an electric power supply device according to the invention will be described with reference to drawings.

A first embodiment of the electric power supply device according to the invention will be described with reference to FIGS. 1 to 4.

Figure 1:
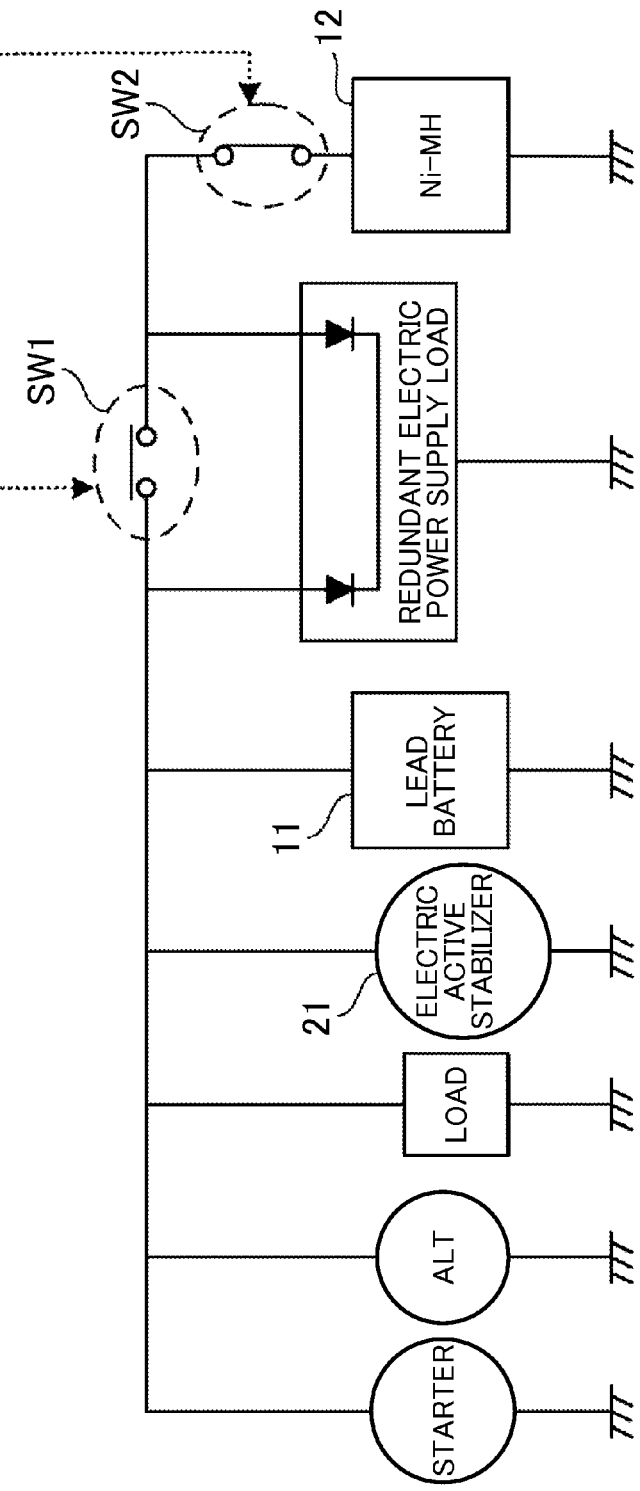
FIG. 1 is a schematic configuration diagram illustrating the overview of an electric power supply device according to a first embodiment.

Firstly, the configuration of the electric power supply device according to the first embodiment will be described with reference to FIG. 1. FIG. 1 is a schematic configuration diagram illustrating the overview of the electric power supply device according to the first embodiment. This electric power supply device is mounted on a vehicle such as a car.

According to FIG. 1, an electric power supply device 100 is configured to be provided with a lead battery 11 as an example of a "first battery" according to the invention, a nickel-hydrogen battery 12 as a "second battery" according to the invention, and an ECU 13.

Each of the lead battery 11 and the nickel-hydrogen battery 12 is configured to be chargeable with electric power resulting from regenerative electric power generation by an alternator (ALT). The alternator may be configured as a motor generator in, for example, a hybrid vehicle.

The lead battery 11 and the nickel-hydrogen battery 12 are electrically connected to a starter motor, a load such as a water pump, a wiper, and a light, an electric active stabilizer 21, a redundant electric power supply load, and the like. The ECU 13 is also included in the load that is electrically connected to the lead battery 11 and the nickel-hydrogen battery 12. However, the ECU 13 will be described to be separate from the load, as illustrated in FIG. 1, for convenience of description.

The redundant electric power supply load includes an electrical component requiring backup electric power supply such as a brake, a shift-by-wire, and a navigation system. The electric active stabilizer 21 is an example of a "high-load instrument" according to the invention. Although not illustrated in FIG. 1, an electric power steering device, an electronically controlled suspension, an electric-type control brake, or the like may be provided as another example of the "high-load instrument" according to the invention.

As illustrated in FIG. 1, the nickel-hydrogen battery 12 is electrically connected to the lead battery 11, the electric active stabilizer 21, and the like via switches SW1, SW2. Each of the switches SW1, SW2 is controlled by the ECU 13.

Specifically, the ECU 13 turns OFF the switch SW2 in the event of the over-discharging or over-charging of the nickel-hydrogen battery 12 or the deterioration of the nickel-hydrogen battery 12. Alternatively, the ECU 13 allows the nickel-hydrogen battery 12 to function as a backup electric power supply for the redundant electric power supply load by turning OFF the switch SW1 and turning ON the switch SW2 when the lead battery 11 fails.

Figure 3:
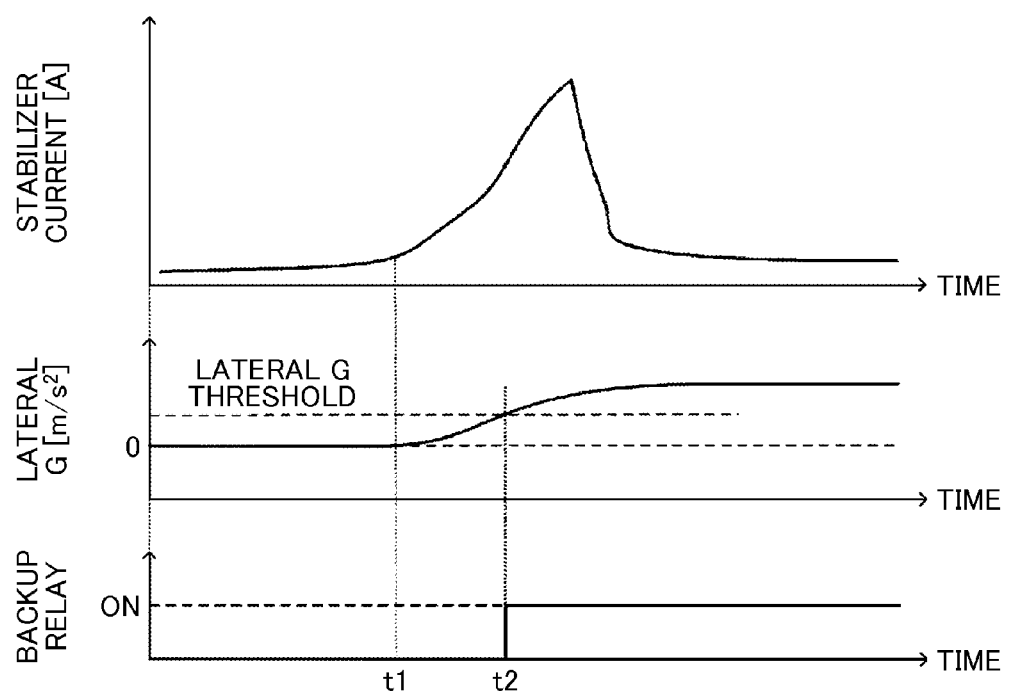
FIG. 3 is a diagram illustrating an example of current consumption during an electric active stabilizer operation.

The electric active stabilizer 21 will be additionally described with reference to FIG. 3. FIG. 3 is a diagram illustrating an example of current consumption during an electric active stabilizer operation.

Figure 2:
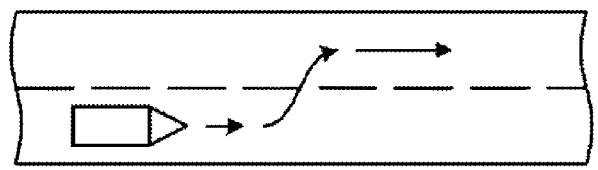
FIG. 2 is a diagram illustrating a lane change by a vehicle.

As illustrated in FIG. 2, lateral acceleration is applied to the vehicle when the vehicle changes its direction by changing lanes during traveling (refer to time t1 and beyond in the middle of FIG. 3). The application of the lateral acceleration to the vehicle causes the electric active stabilizer 21 to be operated and the current consumption to be increased in accordance with the magnitude of the applied lateral acceleration (refer to the upper graph in FIG. 3).

Although the current consumption by the electric active stabilizer 21 depends on the magnitude of the lateral acceleration applied to the vehicle, the peak value of the current consumption is 180 A when, for example, a lateral acceleration of 0.7 G is applied during traveling at 60 km per hour.

The operation of a device that consumes a large amount of currents within a short period of time, such as the electric active stabilizer 21, may result in voltage reduction and affect the other electrical components. A technique for providing a plurality of batteries as a vehicular electric power supply has been proposed in view of voltage stabilization. In the meantime, when a nickel-hydrogen battery is used in a vehicular electric power supply as in the electric power supply device 100, a usual electrical connection of the nickel-hydrogen battery to an alternator, an electrical component, or the like may result in a relatively high frequency of charging and discharging, which, in turn, may cause the nickel-hydrogen battery to be deteriorated relatively early. When the nickel-hydrogen battery needs to be replaced due to the deterioration, for example, more replacement costs are required than in lead battery replacement, and thus it is desirable that the deterioration of the nickel-hydrogen battery is inhibited in view of, for example, reducing a user's burden. The same goes for a lithium-ion battery, an electric double layer capacitor, and the like as well as the nickel-hydrogen battery.

In this embodiment, the switch SW1 is OFF when required electric power can be covered by the lead battery 11 alone so that the deterioration of the nickel-hydrogen battery 12 is inhibited, while the switch SW1 is ON when a relatively large amount of electric power is required so that electric power is output from the lead battery 11 and the nickel-hydrogen battery 12.

Specifically, the peak current value of the electric active stabilizer 21 is predicted to be relatively high when the lateral acceleration applied to the vehicle is equal to or greater than a lateral acceleration threshold (refer to time t2 in FIG. 3) according to FIG. 3, and thus the ECU 13 turns ON the switch SW1 (corresponding to the "backup relay" in FIG. 2). As a result, electric power is supplied to the electric active stabilizer 21 from both the lead battery 11 and the nickel-hydrogen battery 12 and the voltage reduction attributable to the operation of the electric active stabilizer 21 can be prevented.

Electric power supply control processing that is implemented in the electric power supply device 100 having the above-described configuration will be described with reference to the flowchart in FIG. 4.

Figure 4:
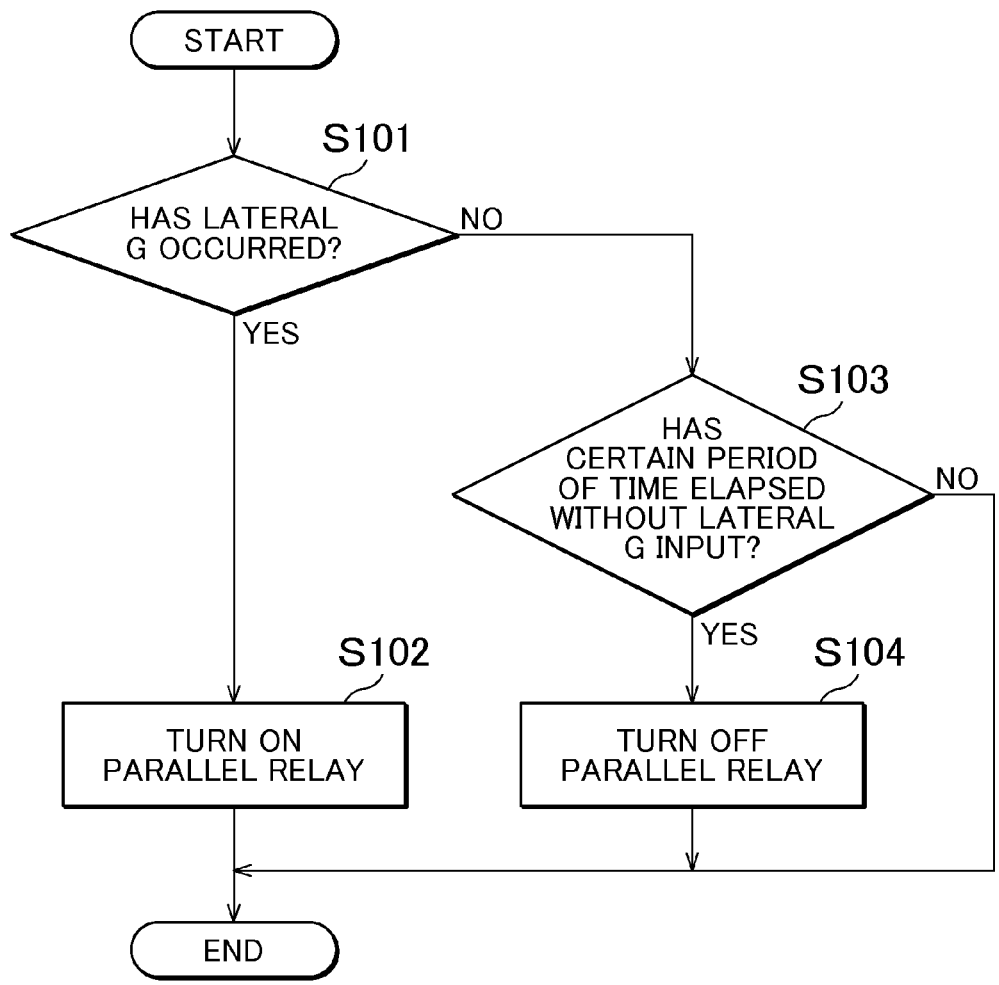
FIG. 4 is a flowchart illustrating electric power supply control processing according to the first embodiment.

According to FIG. 4, the ECU 13 determines (Step S101), based on an output signal from a lateral acceleration sensor 22, whether or not lateral acceleration equal to or greater than the lateral acceleration threshold has occurred in the vehicle. Specifically, the ECU 13 determines, based on the output signal from the lateral acceleration sensor 22, whether or not the absolute value of the lateral acceleration is equal to or greater than "0.3 G" or "0.5 G" as examples of the lateral acceleration threshold.

When it is determined that the lateral acceleration equal to or greater than the lateral acceleration threshold has occurred (Step S101: Yes), the ECU 13 turns ON the switch SW1 (corresponding to the "parallel relay" in FIG. 4) (Step S102). As a result, electric power is supplied to the electric active stabilizer 21 from both the lead battery 11 and the nickel-hydrogen battery 12.

When it is determined that the lateral acceleration equal to or greater than the lateral acceleration threshold has not occurred (Step S101: No), the ECU 13 determines (Step S103), based on the output signal from the lateral acceleration sensor 22, whether or not the lateral acceleration has been absent for a certain period of time. In other words, the ECU 13 determines whether or not the electric active stabilizer 21 has been out of operation for a certain period of time.

When it is determined that the lateral acceleration has been absent for a certain period of time (Step S103: Yes), the ECU 13 turns OFF the switch SW1 (Step S104) on the condition that the high-load instruments other than the electric active stabilizer 21, such as the electric power steering device, the electronically controlled suspension, and the electric-type control brake, are not in operation.

The ECU 13 temporarily terminates the processing when it is determined that a certain period of time has not elapsed since the occurrence of the lateral acceleration (Step S103: No).

The "ECU 13" according to this embodiment is an example of the "control means" according to the invention. In other words, in this embodiment, some of the functions of the ECU 13 for various types of electronic control in the vehicle are used as parts of the electric power supply device 100. In the electric power supply device 100, a lithium-ion battery, an electric double layer capacitor, or the like may be used in place of the nickel-hydrogen battery 12.

A second embodiment of the electric power supply device according to the invention will be described with reference to FIG. 5. Aside from how the lead battery and the nickel-hydrogen battery are electrically connected to each other, the second embodiment is similar to the first embodiment described above. Accordingly, description of the parts common to the first and second embodiments will be omitted while the same reference numerals will be used to refer to the same parts in the drawings. Basically, only the differences will be described with reference to FIG. 5.

Figure 5:
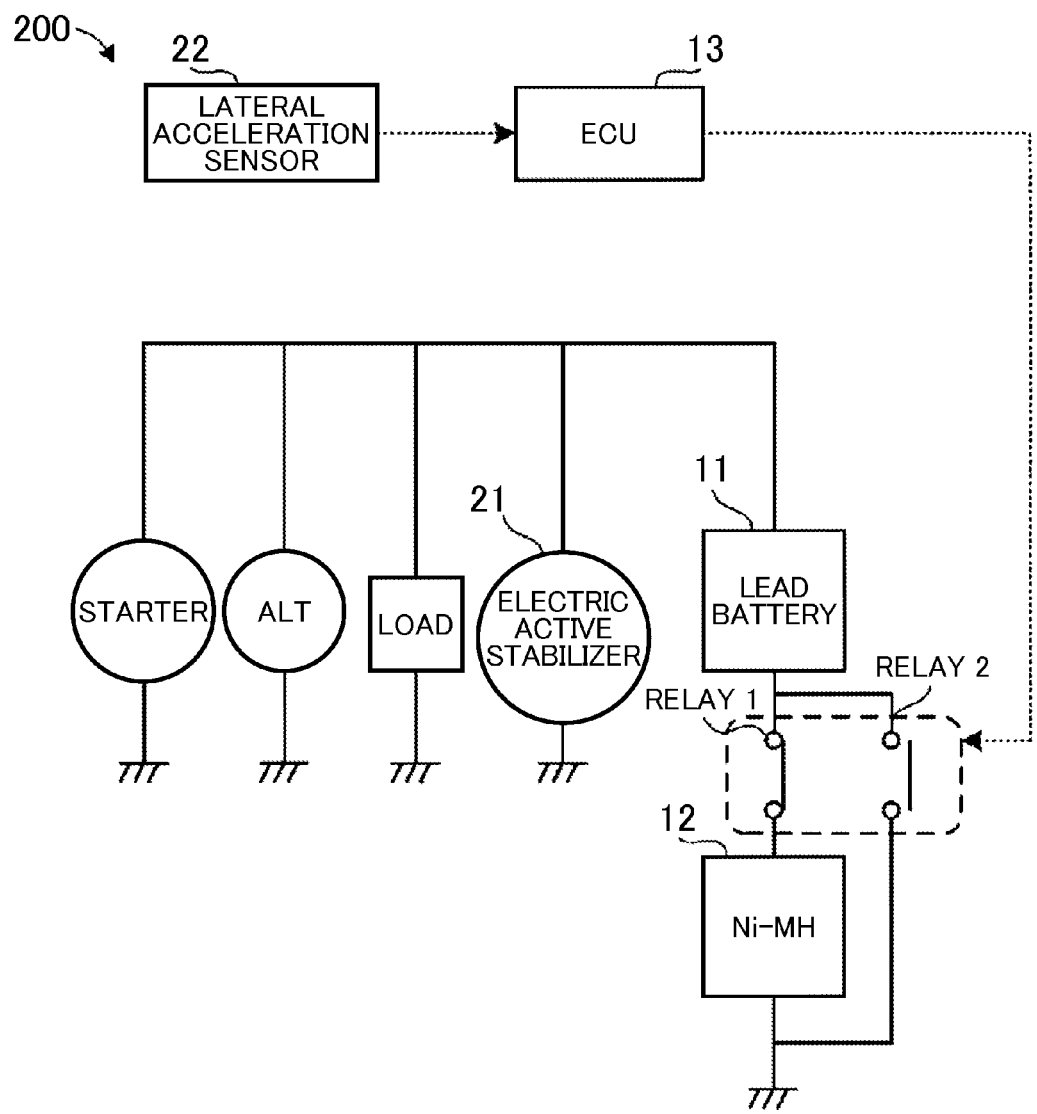
FIG. 5 is a schematic configuration diagram illustrating the overview of an electric power supply device according to a second embodiment.

In an electric power supply device 200 according to this embodiment, the nickel-hydrogen battery 12 is electrically connected in series to the lead battery 11 via a relay circuit as illustrated in FIG. 5. The ECU 13 turns OFF the relay 1 and turns ON the relay 2 when required electric power can be covered by the lead battery 11 alone so that the deterioration of the nickel-hydrogen battery 12 is inhibited. When a relatively large amount of electric power is required, such as during the operation of the electric active stabilizer 21, the relay 1 is ON and the relay 2 is OFF so that electric power is output from the lead battery 11 and the nickel-hydrogen battery 12.

The invention is not limited to the embodiments described above. Instead, the invention can be appropriately modified without departing from the claims and the summary and spirit of the invention which can be read from the entire specification. Any electric power supply device resulting from such modification is included in the technical scope of the invention.

What is claimed is:

1. An electric power supply device for a vehicle, the vehicle including a plurality of load instruments, the load instruments including a high-load instrument, the high-load instrument being a load instrument with reference electric power consumption equal to or greater than an electric power threshold, the electric power supply device comprising:

a first battery electrically connected to each of the load instruments and supplying electric power to each of the load instruments;

a switch;

a second battery electrically connected to the first battery and each of the load instruments via the switch and supplying electric power to each of the load instruments; and an electronic control unit (ECU) configured to control the switch to be OFF when the high-load instrument is not in operation.

2. The electric power supply device according to claim 1, further comprising:

a lateral acceleration sensor detecting a lateral acceleration of the vehicle, wherein the high-load instrument is an electric active stabilizer, and the ECU is configured to control the switch to be ON when the detected lateral acceleration is equal to or greater than an acceleration threshold.

3. The electric power supply device according to claim 1, wherein the first battery and the second battery are different types of batteries and the second battery is a nickel-hydrogen battery, a lithium-ion battery, or an electric double layer capacitor.

4. The electric power supply device according to claim 1, wherein the first battery and the second battery are electrically connected in parallel to each other.

* * * * *